March 20, 1951 E. CREWDSON 2,546,089
PUMPING APPARATUS
Filed Dec. 20, 1946 2 Sheets-Sheet 2

Inventor
E. Crewdson

Patented Mar. 20, 1951

2,546,089

UNITED STATES PATENT OFFICE 2,546,089

PUMPING APPARATUS

Eric Crewdson, Kendal, England, assignor to Gilbert Gilkes and Gordon Limited, Kendal, England Application December 20, 1946, Serial No. 717,561
In Great Britain February 11, 1939

Section 1, Public Law 690, August 8, 1946
Patent expires February 11, 1959

2 Claims. (Cl. 103—1)

This invention relates to pumping apparatus of the kind comprising a piston operating in a chamber connected with a suction pipe furnished with a foot or non-return valve at a point remote from the chamber, in such manner as to produce compression waves in the liquid.

The effect of the compression waves produced in the body of liquid within the chamber and the suction pipe is to cause the liquid to pass from the suction to a delivery passage which, according to one proposal, has been furnished with an outlet valve adapted to close under the action of the pressure produced in the chamber by the reciprocation of the piston, and another proposal has been to arrange for the delivery passage to be throttled throughout the stroke of the piston to a constant degree.

The invention consists, broadly in a pumping apparatus of the kind in question comprising means adapted to secure a variation in the degree of throttling of the outlet from the chamber in which the piston operates during the piston cycle without, however, securing complete obturation of the outlet in the form of a cam-shaped member exposing a surface which in the motion of the cam approaches towards and recedes from the opening constituting the outlet.

Preferably, in accordance with the invention, the surface is constituted by the periphery of a cam-shaped member secured on the crankshaft by which motion is imparted to the piston.

In one construction, in accordance with the invention, the crankshaft on which the cam-shaped member is mounted is arranged in a closed housing furnished with a connection for the suction pipe and with a diaphragm in which are arranged side by side the piston chamber and the delivery port, which is adapted to be throttled by the cam-shaped member, the housing on one side of the diaphragm being furnished with means whereby the liquid may pass from the housing.

The invention will be described further in detail and by way of example with reference to the accompanying drawings in which—

Figure 1:
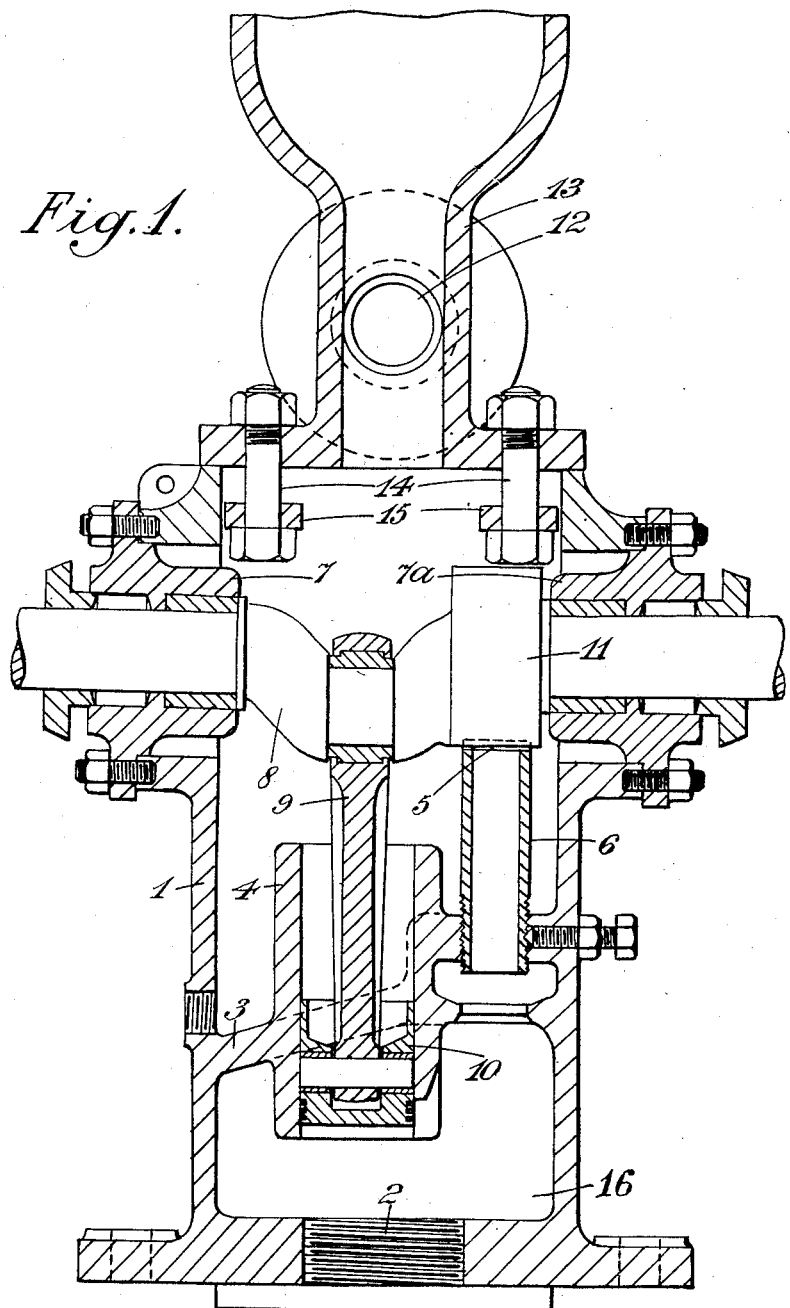
Figure 1 is a view in sectional elevation.
Figure 2:
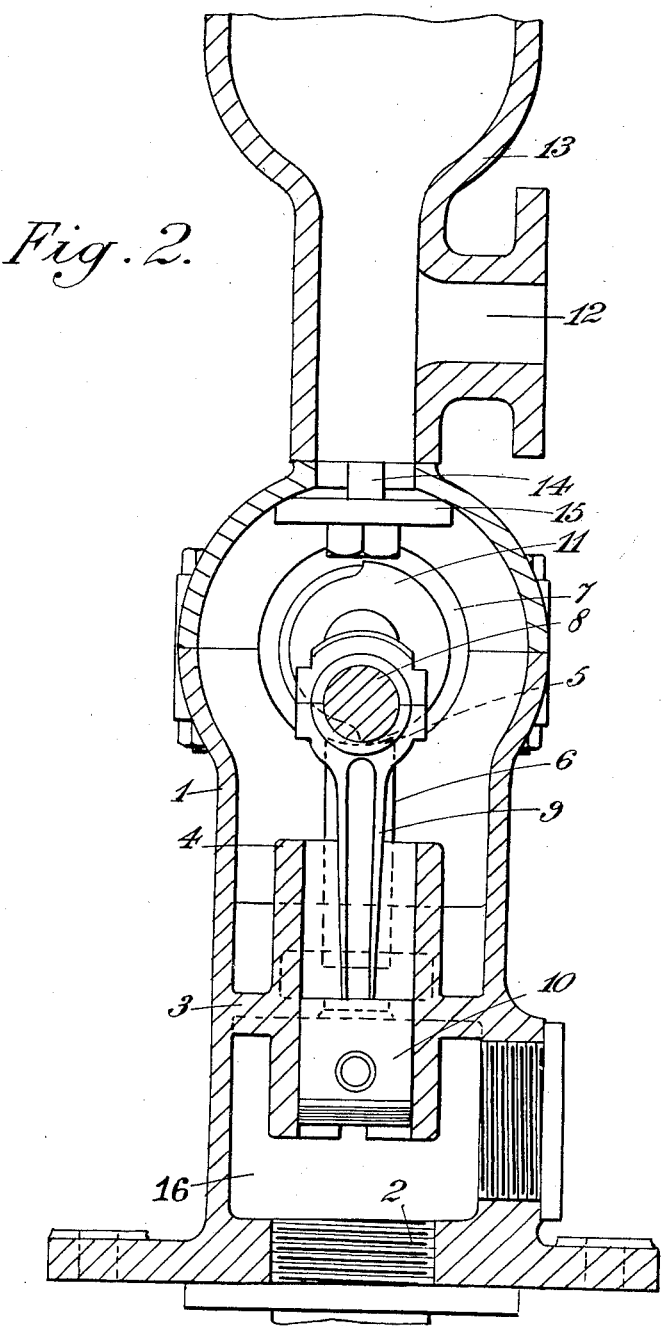
Figure 2 is a similar view in section on a plane at right angles to the plane of section of Figure 1 illustrating one construction in accordance with the invention.

The construction illustrated comprises a housing 1 furnished with a connection 2 for the suction pipe 17 in which is a foot valve 18 and with a diaphragm 3 in which are arranged side by side a compressor cylinder or piston chamber 4 leading into the chamber 16 and a delivery port 5 constituted by the end of the tube 6.

In the housing are formed bearings 7 and 7a for a crankshaft 8 engaged by a piston rod 9 extending to a piston 10.

On the crankshaft there is provided a cam 11 which co-operates with the end of the tube 6 in controlling the delivery of liquid through it, the end of the tube being the opening which constitutes the outlet from the chamber in which the piston operates.

The cam, as will be seen, is formed so as to constitute a surface which approaches and recedes from the opening constituted by the end of the tube without, however, permitting the surface to completely obturate the opening.

The outflow of liquid takes place through the passage 12 provided in the air chamber 13 which is connected with the top of the pump housing by bolts 14 and bridge pieces 15.

I claim:

1. Pumping apparatus of the kind in which there is provided a piston operating in a chamber connected to a suction pipe furnished with a foot or non-return valve at a point remote from the chamber in such manner as to produce compression waves in the liquid, comprising a pipe leading to the liquid supply, a foot valve at one end of the pipe, a chamber at the other end of the pipe, an outlet for liquid freely communicating with the chamber, a compressor cylinder in the chamber, a piston adapted for reciprocation in the compressor cylinder, a crankshaft adapted to impart reciprocating motion to the piston and a cam on the crankshaft, the surface of which in the rotation of the cam, operates to secure a variation in the degree of throttling of the outlet without securing the complete obturation thereof.

2. Pumping apparatus as claimed in claim 1 comprising a closed housing in which the crankshaft and the cam are located, a connection in the housing for the suction pipe, a diaphragm in the housing through which extends the compressor cylinder and a tube extending through the diaphragm, one end of which tube reaches to a position adjacent to the cam member so that in its rotation the cam will secure a variation in the degree of throttling of the liquid passing through the tube.

ERIC CREWDSON.

REFERENCES CITED

The following references are of record in the file of this patent:

UNITED STATES PATENTS

| Number | Name | Date |
| --- | --- | --- |
| 1,730,337 | Bellocq | Oct. 1, 1929 |